United States Patent
Mavureddi Dhanasekaran

(10) Patent No.: US 12,381,727 B2
(45) Date of Patent: Aug. 5, 2025

(54) MBS SECURITY IN UE MOBILITY

(71) Applicant: Nokia Technologies Oy, Espoo (FI)

(72) Inventor: Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 235 days.

(21) Appl. No.: 17/817,135

(22) Filed: Aug. 3, 2022

(65) Prior Publication Data

US 2023/0037970 A1    Feb. 9, 2023

Related U.S. Application Data

(60) Provisional application No. 63/229,249, filed on Aug. 4, 2021.

(51) Int. Cl.
*H04L 9/08* (2006.01)
*H04L 9/40* (2022.01)
(Continued)

(52) U.S. Cl.
CPC .......... *H04L 9/0891* (2013.01); *H04L 9/0833* (2013.01); *H04L 9/0861* (2013.01);
(Continued)

(58) Field of Classification Search
CPC ... H04L 9/0891; H04L 9/0833; H04L 9/0861; H04L 63/104; H04L 63/065; H04L 63/068; H04L 2209/80; H04W 12/041; H04W 12/0431; H04W 12/0433; H04W 36/0007; H04W 36/0038; H04W 4/08; H04W 12/08; H04W 12/106; H04W 4/06
See application file for complete search history.

(56) References Cited

U.S. PATENT DOCUMENTS

2012/0134313 A1*  5/2012  Jung ............... H04L 12/185
                                                       370/312
2014/0093082 A1*  4/2014  Jung ............... H04L 9/0833
                                                       380/270
(Continued)

OTHER PUBLICATIONS

3GPP TS 23.247 V1.0.0 $3^{rd}$ Generation Partnership Project; Technical Specification Group Services and System Aspects; Architectural Enhancements for 5G Multicast-broadcast Services; Stage 2 (Release 17) Jun. 2021.

(Continued)

*Primary Examiner* — Cheng-Feng Huang
(74) *Attorney, Agent, or Firm* — McCarter & English, LLP

(57) ABSTRACT

In response to a UE in a wireless network leaving a multicast group to which the user equipment belonged or switching between multiple access nodes belonging to the multicast group, sending by an access node a rekeying token for UE(s) in the multicast group to use to access data for the multicast group. The access node generates key(s) based at least on the rekeying token. The access node multicasts traffic to the UE(s) in the multicast group using the key(s). In response to an other UE in a wireless network leaving a multicast group to which a UE belongs or switching by the UE between multiple access nodes belonging to the multicast group, receiving, at the UE from an access node, a rekeying token to use. The UE generates key(s) based at least on the rekeying token and receives multicast traffic using the key(s).

15 Claims, 10 Drawing Sheets

(51) Int. Cl.
  *H04W 4/06* (2009.01)
  *H04W 12/041* (2021.01)
  *H04W 12/0431* (2021.01)
  *H04W 12/0433* (2021.01)
  *H04W 36/00* (2009.01)
  *H04W 4/08* (2009.01)
  *H04W 12/08* (2021.01)
  *H04W 12/106* (2021.01)

(52) U.S. Cl.
  CPC ............ *H04L 63/104* (2013.01); *H04W 4/06* (2013.01); *H04W 12/041* (2021.01); *H04W 12/0431* (2021.01); *H04W 12/0433* (2021.01); *H04W 36/0007* (2018.08); *H04W 36/0038* (2013.01); *H04L 63/065* (2013.01); *H04L 63/068* (2013.01); *H04L 2209/80* (2013.01); *H04W 4/08* (2013.01); *H04W 12/08* (2013.01); *H04W 12/106* (2021.01)

(56) References Cited

U.S. PATENT DOCUMENTS

2015/0026453 A1* 1/2015 Liu .................. H04L 63/08
 713/151
2021/0144727 A1* 5/2021 Pan .................. H04W 4/40

OTHER PUBLICATIONS

3GPP TS 38.331 V16.5.0 3$^{rd}$ Generation Partnership Project; Technical Specification Group Radio Access Network; NR; Radio Resource Control (RRC) Protocol Specification (Release 16) Jun. 2021.
3GPP TR 33.850 V0.4.0 3$^{rd}$ Generation Partnership Project; Technical Specification Group Services and System Aspects; Study on Security Aspects of Enhancements for 5G Multicast-Broadcast Services (MBS) (Release 17) Jan. 2021.
3GPP TR 23.757 V1.2.0 3$^{rd}$ Generation Partnership Project; Technical Specification Group Services and System Aspects; Study on Architectural Enhancements for 5G Multicast-Broadcast Services (Release 17) Nov. 2020.

* cited by examiner

PAGING MESSAGE
=============

```
-- ASN1START
-- TAG-PAGING-START

Paging ::=                    SEQUENCE {
    pagingRecordList              PagingRecordList                        OPTIONAL,   -- Need N
    lateNonCriticalExtension      OCTET STRING                            OPTIONAL,
    pagingCause                   ENUMERATED {voice,MBSKeyUpdate}         OPTIONAL,
    nonCriticalExtension          SEQUENCE{}
}

PagingRecordList ::= SEQUENCE (SIZE(1..maxNrofPageRec)) OF PagingRecord

PagingRecord ::=              SEQUENCE {
    ue-Identity                   PagingUE-Identity,
    accessType                    ENUMERATED {non3GPP}                    OPTIONAL,   -- Need N
    ...
}

PagingUE-Identity ::=         CHOICE {
    ng-5G-S-TMSI                  NG-5G-S-TMSI,
    fulll-RNTI                    I-RNTI-Value,
    ...
}

-- TAG-PAGING-STOP
-- ASN1STOP
```

FIG.9

MBS SECURITY IN UE MOBILITY

CROSS-REFERENCE TO RELATED APPLICATIONS

The present application claims the benefit under 35 U.S.C. § 119 (e) of U.S. Provisional Patent Application No. 63/229,249, filed on Aug. 4, 2021, the disclosure of which is hereby incorporated by reference in its entirety. Any and all applications for which a foreign or domestic priority claim is identified in the Application Data Sheet of the present application are hereby incorporated by reference under 37 CFR § 1.57.

TECHNICAL FIELD

Exemplary embodiments herein relate generally to wireless networks and, more specifically, relate to key distribution within the networks.

BACKGROUND

In cellular wireless networks, there is a concept of Multicast-Broadcast Service (MBS). MBS is a technology allows a potentially infinite number of mobile users to consume the same content at once, using just a fixed amount of network resources. These provide for functions such as public safety, vehicle-to-everything (V2X) applications, group communications, and Internet of Things (IoT) applications.

For background on MBS, consider the subject matter in 3GPP TR 33.850 V0.4.0 (2021-01). The following two paragraphs are paraphrased from TR 33.850.

Two delivery methods are envisioned for 5G MBS service, from the view point of a 5G core network (5GC, where 5G is fifth generation): 5GC individual MBS traffic delivery method, and 5GC shared MBS traffic delivery method. For the 5GC individual MBS traffic delivery method, the 5GC receives a single copy of MBS data packets and delivers separate copies of those MBS data packets to individual UEs (user equipment) via per-UE sessions. For the 5GC shared MBS traffic delivery method, the 5GC receives a single copy of MBS data packets and delivers a single copy of those MBS packets packet to a RAN (radio access network) node, which then delivers them to one or multiple UEs. The RAN delivers MBS data to UEs using either Point-to-Point (PTP) delivery or Point-to-Multipoint (PTM) delivery.

One of the issues concerning MBS involves security issues, particularly key issues. Keys are used to encrypt and decrypt data and for other security purposes. For instance, if a RAN node is using MBS to broadcast information, that information should only be able to be decrypted by those UEs having authorization to decrypt the information. In particular, if authentication for multicast communication service is not supported, an attacker may spoof a legitimate UE to gain access to an MBS service. If authorization for multicast communication service is not supported, an attacker may gain free access to content without any knowledge of the service provider. In addition, an attacker may use the 3GPP network to gain "free access" of MBS services and other services on another user's bill.

Thus, there are still possible security issues with MBS, and particularly with key distribution for such security.

BRIEF SUMMARY

This section is intended to include examples and is not intended to be limiting.

In an exemplary embodiment, a method is disclosed that includes, in response to a user equipment in a wireless network leaving a multicast group to which the user equipment belonged or switching between multiple access nodes belonging to the multicast group, sending by an access node a rekeying token for one or more user equipment in the multicast group to use to access data for the multicast group. The method includes generating by the access node one or more keys based at least on the rekeying token, and multicasting traffic from the access node to the one or more user equipment in the multicast group using the one or more keys.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: in response to a user equipment in a wireless network leaving a multicast group to which the user equipment belonged or switching between multiple access nodes belonging to the multicast group, send by an access node a rekeying token for one or more user equipment in the multicast group to use to access data for the multicast group; generate by the access node one or more keys based at least on the rekeying token; and multicast traffic from the access node to the one or more user equipment in the multicast group using the one or more keys.

An exemplary computer program product includes a computer-readable storage medium bearing computer program code embodied therein for use with a computer. The computer program code includes: code, in response to a user equipment in a wireless network leaving a multicast group to which the user equipment belonged or switching between multiple access nodes belonging to the multicast group, for sending by an access node a rekeying token for one or more user equipment in the multicast group to use to access data for the multicast group; code for generating by the access node one or more keys based at least on the rekeying token; and code for multicasting traffic from the access node to the one or more user equipment in the multicast group using the one or more keys.

In another exemplary embodiment, an apparatus comprises means for performing: in response to a user equipment in a wireless network leaving a multicast group to which the user equipment belonged or switching between multiple access nodes belonging to the multicast group, sending by an access node a rekeying token for one or more user equipment in the multicast group to use to access data for the multicast group; generating by the access node one or more keys based at least on the rekeying token; and multicasting traffic from the access node to the one or more user equipment in the multicast group using the one or more keys.

In an exemplary embodiment, a method is disclosed that includes, in response to an other user equipment in a wireless network leaving a multicast group to which a user equipment belongs or switching by the user equipment between multiple access nodes belonging to the multicast group, receiving, at the user equipment from an access node, a rekeying token for the user equipment in the multicast group to use to access data for the multicast group. The method includes generating by the user equipment one or more keys based at least on the rekeying token, and receiving, by the user equipment from the access node, multicast traffic using the one or more keys.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: in response to an other user equipment in a wireless network leaving a multicast group to which a user equipment belongs or switching by the user equipment between multiple access nodes belonging to the multicast group, receive, at the user equipment from an access node, a rekeying token for the user equipment in the multicast group to use to access data for the multicast group; generate by the user equipment one or more keys based at least on the rekeying token; and receive, by the user equipment from the access node, multicast traffic using the one or more keys.

An exemplary computer program product includes a computer-readable storage medium bearing computer program code embodied therein for use with a computer. The computer program code includes: code, in response to an other user equipment in a wireless network leaving a multicast group to which a user equipment belongs or switching by the user equipment between multiple access nodes belonging to the multicast group, for receiving, at the user equipment from an access node, a rekeying token for the user equipment in the multicast group to use to access data for the multicast group; code for generating by the user equipment one or more keys based at least on the rekeying token; and code for receiving, by the user equipment from the access node, multicast traffic using the one or more keys.

In another exemplary embodiment, an apparatus comprises means for performing: in response to an other user equipment in a wireless network leaving a multicast group to which a user equipment belongs or switching by the user equipment between multiple access nodes belonging to the multicast group, receiving, at the user equipment from an access node, a rekeying token for the user equipment in the multicast group to use to access data for the multicast group; generating by the user equipment one or more keys based at least on the rekeying token; and receiving, by the user equipment from the access node, multicast traffic using the one or more keys.

BRIEF DESCRIPTION OF THE DRAWINGS

In the attached Drawing Figures:

FIG. 9 is an example of a paging message used in the signaling diagram of FIG. 10;

DETAILED DESCRIPTION OF THE DRAWINGS

Figure 1:
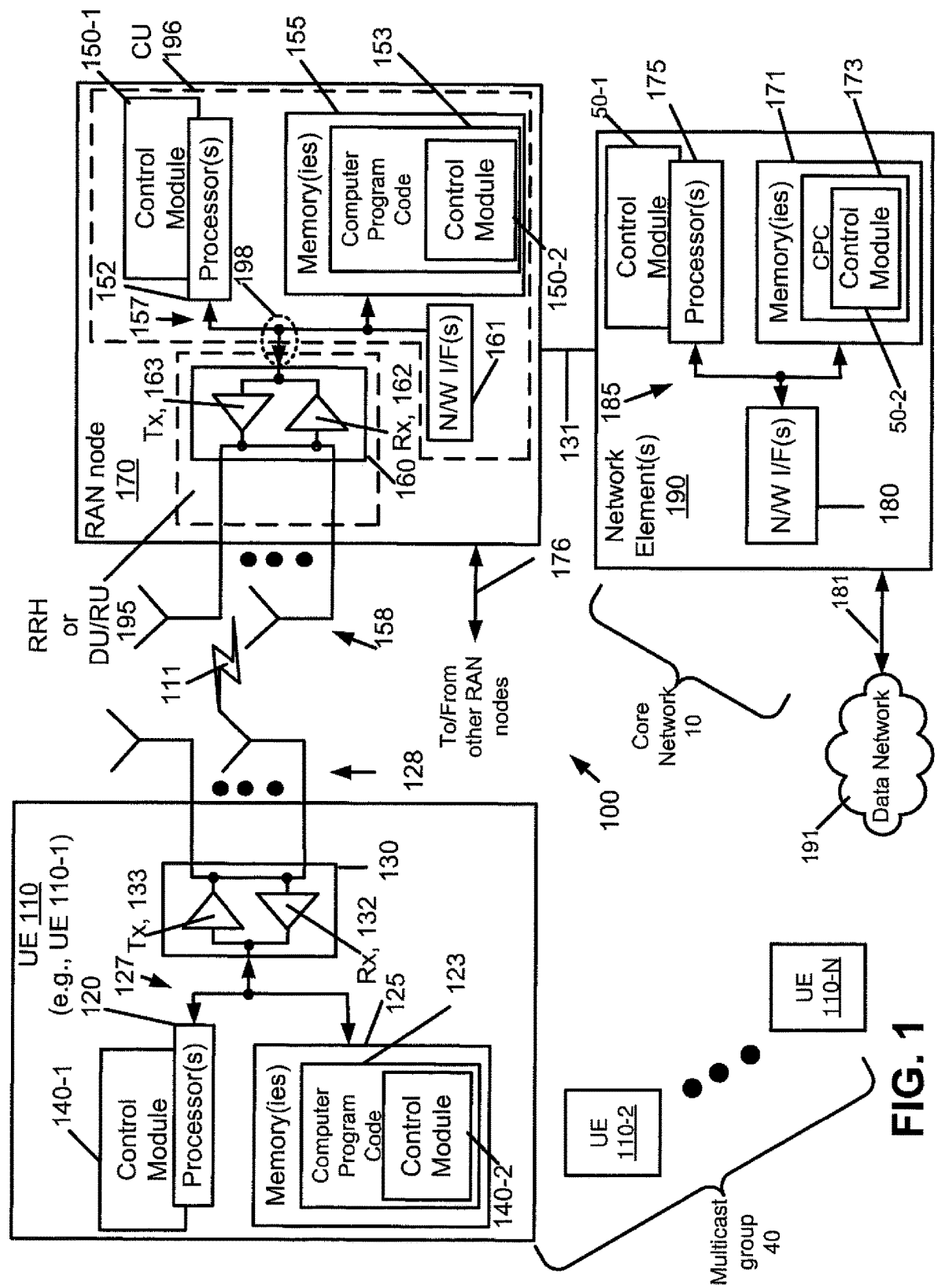
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for MBS security in UE mobility. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network.

There could be multiple UEs 110 also. For instance, multicast group 40 includes UEs 110-1, 110-2, . . . , 110-N, where N≥2. The multicast group 40 may also be referred to herein as an MSB group 40. Each of these UEs 110 is part of an MBS session. In FIG. 1, there is a wireless link 111 between the UE 110-1 and the RAN node 170. Each of the UEs 110-2 through 110-N would have similar wireless links 111, but these are not shown for clarity.

It is assumed that each UE 110 is similar, therefore the exemplary circuitry of only one UE 110 is described here. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station or other access node that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network 10 functionality, and which provide connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)) and/or unified data management (UDM). Such core network functionality for LTE may include MME (Mobility Management Entity)/SGW (Serving Gateway) functionality. These are merely exemplary functions that may be supported by the network element(s) 190, and note that both 5G and LTE functions might be supported.

The network element 190 includes a control module 50, comprising one of or both parts 50-1 and/or 50-2, which may be implemented in a number of ways. The control module 50 may be implemented in hardware as control module 50-1, such as being implemented as part of the one or more processors 175. The control module 50-1 may be implemented alternatively or additionally as an integrated circuit or through other hardware such as a programmable gate array. In another example, the control module 50 may be implemented alternatively or additionally as control module 50-2, which is implemented as computer program code (CPC) 173 and is executed by the one or more processors 175. For instance, the one or more memories 171 and the computer program code 173 are configured to, with the one or more processors 175, cause the network element 190 to perform one or more of the operations as described herein.

The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As previously stated, 3GPP TR 33.850 V0.4.0 (2021-01) provides background on the security issues relating to MBPS in 5G networks. TR 33.850 additionally outlines potential issues with key distribution. For instance, in 5.2, TR 33.850 describes a key issue as being security protection of MBS traffic. This section describes that MBS traffic needs to be delivered from an application service provider to multiple UEs through the 5G system. There was a recommendation for the 5G system to provide native security.

This TR also discusses security threats in section 5.2.2 and potential security requirements in section 5.2.3. Issues include an attacker that can receive the MBS broadcast for free or possibly send a fake broadcast, and the corresponding need for the 5G system to protect against such attacks. To prevent such attacks, the network should ensure that only legitimate UEs belonging to a particular broadcast group are able to receive the broadcast data. Also, the broadcast data should be encrypted so that even if some non-member eavesdrops at some node, they are not able to decode the data. Further, if an attacker succeeds in altering broadcast data or injecting incorrect data, it should be possible for the receiving UEs to detect the incorrect data and discard it. Similar requirements exist in the management of the broadcast group. Hence, the broadcast data should be encrypted as well integrity-protected with appropriate encryption and integrity keys.

In case additional detail about integrity is needed, refer to 3GPP TS 33.501 Annex D.3 for integrity examples. For this detail, a MAC (Message authentication Code) is generated using symmetric encryption algorithm provides integrity protection to the plain text or ciphered text.

The MAC takes the input as a private key and the message plain or ciphered, similar to a hash function, and the system generates a digest or authentication code. MAC is attached along with message (plain or ciphered) and sent to a receiver. The receiver will try to compute with the receiver's private keys and received message and generate an expected MAC. If the expected or generated MAC at the receiver and received MAC are same, this implies not only that message arrived intact but also the message is hashed using same private key.

As an example, a NAS security mode command message sent from the AMF to the UE has all text or content in plain text (i.e., not encrypted) but MAC is attached to it. The receiver will verify if the expected MAC is same as the received MAC; if yes, then plain text received is not modified by the attacker or MiTM (man in the middle). If the expected MAC and received MAC code is different, then the integrity check fails and respective action is taken according to the procedure handling.

For integrity protection of RRC/UP (user plane) messages, the RRC/UP level keys are derived in the UE and 5GC. For NAS message protection, NAS-level keys are derived in the UE and 5GC independently. These keys are used in respective messages (control plane, CP, or user plane, UP) protection.

The network also needs to dynamically manage the UE members joining the group and leaving the group. This means the MBS data encryption and integrity keys should be valid only for the current members of the group at any point in time. When a new member UE is added to an MBS group, the new member UE needs to get the existing keys, or the network could decide the keys need to be updated to include the new member. Similarly, if a member UE leaves the group, the existing keys should be updated so that the UE that left should not be able to decrypt broadcast messages occurring after departure of the UE.

This TR in section 5.3 and its subsection discusses security protection of key distribution. One issue is that keys are required for PTM services, and these keys are one-to-many (i.e., RAN node to UEs) keys, as compared to keys for a UE, which is a one-to-one (UE to RAN node) key.

For security threats, the keys need to be integrity and anti-replay protected, and they also need to be updated. Otherwise, when a UE leaves or joins a group, there is a potential for the UE to access the group after having left, see previous content when joining, or inject fake content into the stream for the group.

In order to address these and other issues, the exemplary embodiments provide a secure framework for key distribution and multicast broadcast group management. As an overview, exemplary embodiments may provide one or more of the following.

1) An encryption key for an MBS session is generated at the RAN node 170 and UE 110 from parameters such as one or more of the following: a Temporary Mobile Group Identifier (TMGI), a multicast group token, a rekeying token (needed only when rekeying, otherwise by default it is zero for initial key generation), an encryption algorithm and/or an algorithm ID. An integrity key for the MBS session is similarly generated at RAN node 170 and UE 110 from parameters such as one or more of the following: a TMGI, multicast group token, rekeying token (needed only when rekeying, otherwise by default it is zero for initial key generation), an integrity algorithm and/or an algorithm ID.

2) When the UE 110 joins the multicast group identified by the TMGI and its session, after the PDU session establishment, an SMF shares the multicast group token, TMGI, and rekeying token list to the RAN node 170 via an AMF. The rekeying token list contains many pre-generated rekeying tokens needed for this particular session.

3) The rekeying token list is stored in the RAN node 170 for future use. The RAN node 170 and the UE 110 generate independently the encryption and integrity keys for this MBS session.

4) MBS traffic is encrypted and integrity-protected at a RAN level. Received MBS traffic is decrypted and an integrity check is performed at the UE 110.

5) When a UE or a few UEs leave the MBS group, then a rekeying token from the stored list in the RAN node 170 is retrieved. Using this rekeying token, new keys are generated at the RAN node 170 and UEs 110 in the ongoing MBS session and further sessions, and used until another member leaves or joins the group.

Now that an overview has been provided, additional details are provided. Multicast key generation, an exemplary procedure to distribute those keys from the network 100 to the UEs belonging to a multicast group identified by TMGI, and a rekeying procedure are described below in detail.

First, consider MBS key generation. For the multicast broadcast encryption key generation for traffic, the key is referred to as KMTenc, and parameters like TMGI (Temporary mobile group identifier), multicast group token, rekeying token (if available, otherwise default value "0" is used), encryption algorithm and/or encryption algorithm ID may be used. For the multicast broadcast integrity key generation for traffic, the key is referred to as KMTint, and parameters like TMGI (Temporary mobile group identifier), multicast group token, rekeying token (if available, otherwise default value "0" is used), integrity algorithm and/or integrity algorithm ID may be used.

Figure 2:
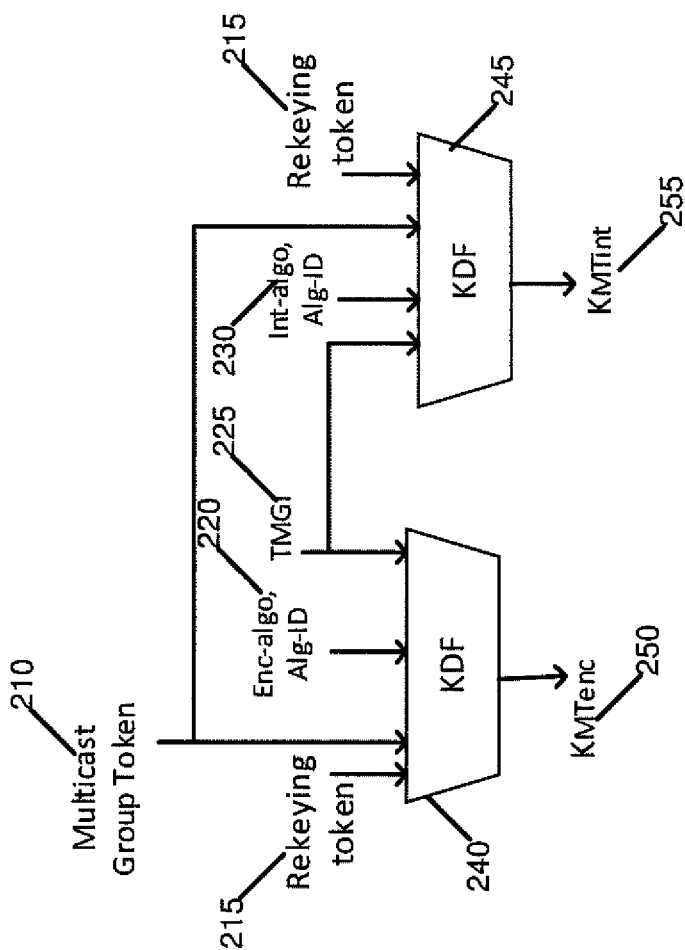
FIG. 2 is an illustration of key generation at a UE and RAN node, in accordance with an exemplary embodiment.

FIG. 2 is an illustration of key generation at a UE and RAN node, in accordance with an exemplary embodiment. The RAN node and the UE need to be triggered to create new keys based on a Key Derivation Function (KDF). The Key Derivation Function (KDF) 240 has inputs of a rekeying token 215, a multicast group token 210, an encryption algorithm (Enc-algo) and algorithm ID (Alg-ID) (see reference 220), and a TMGI 225. The KDF 240 produces the encryption key 250, KMTenc. The KDF 245 has inputs of a rekeying token 215, a multicast group token 210, an integrity algorithm (Int-algo) and algorithm ID (Alg-ID) (see reference 230), and TMGI 225. The KDF 245 produces the integrity key 255, KMTint. The input parameters to the KDF may be sent to the UE and the RAN node by appropriate control node in the 5G Core network.

With respect to the algorithms, refer, e.g., to 3GPP TS 33.501. In short, Enc-algo is the algorithm distinguisher for encryption algorithms and Alg-ID is to identify which algorithm to be used for encryption. Further, Int-algo is the algorithm distinguisher for integrity algorithms and Alg-ID is to identify which algorithm to be used for integrity protection.

In an exemplary embodiment, the RAN node 170 gets the parameters for the key generation from 5G core network nodes such as MB-SMF/AMF. This is detailed in 3GPP TR 23.757, see, e.g., 3GPP TR 23.757 V1.2.0 (2020-11).

Figure 3:
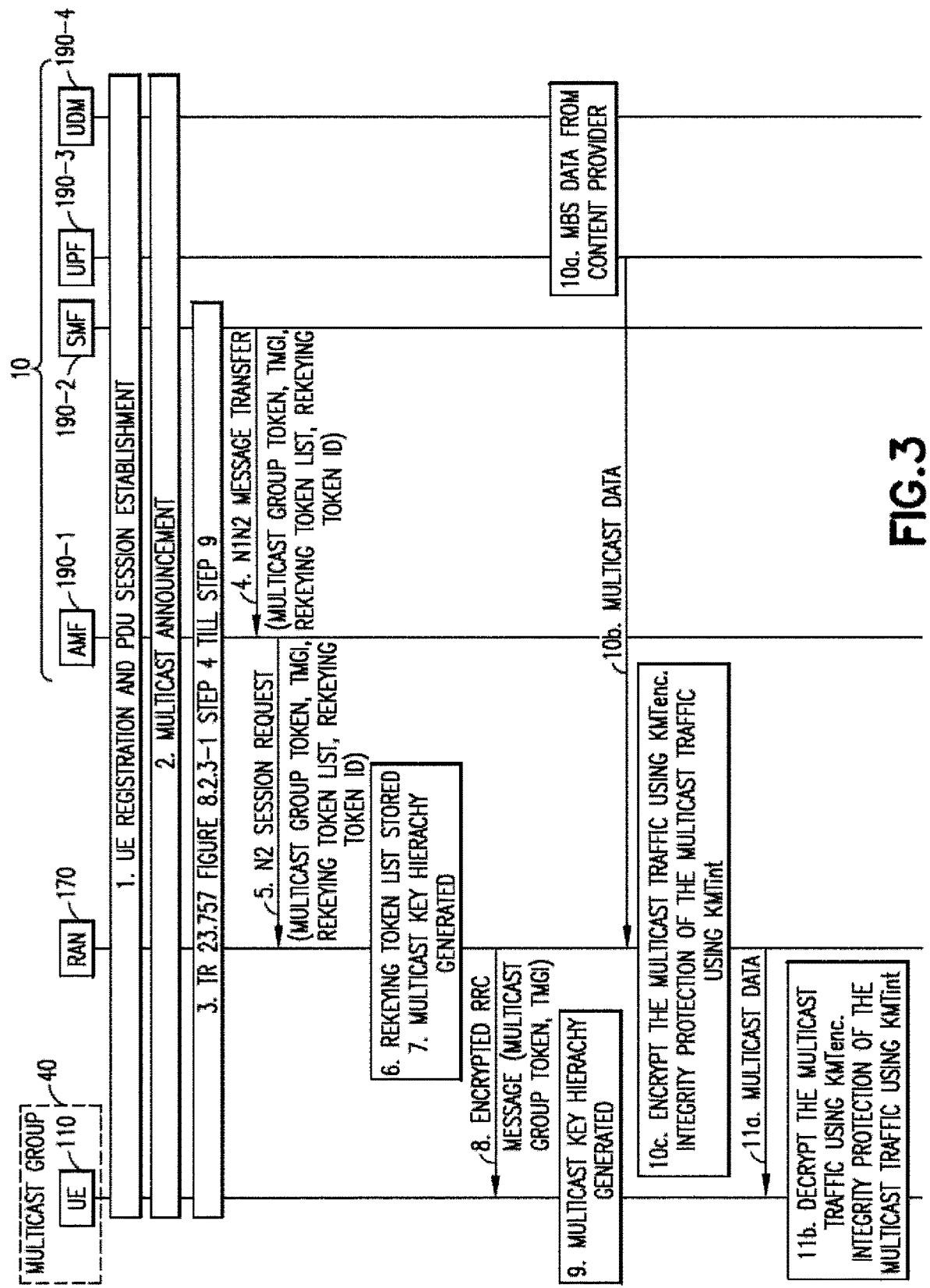
FIG. 3 is a signaling diagram of an exemplary MBS procedure for key generation and traffic protection, in accordance with an exemplary embodiment.

Now that an example of key generation has been described, an exemplary MBS procedure for key generation and traffic protection is described. This example is described using FIG. 3, which is a signaling diagram of an exemplary MBS procedure for key generation and traffic protection, in accordance with an exemplary embodiment. FIG. 3 illustrates signaling between a UE 110, a RAN node 170, and multiple network elements 190 in the core network 10: an AMF 190-1; an SMF 190-2; a UPF 190-3; and a UDM 190-4. The UE 110 performs the operations under control of its control module 140, the RAN node 170 under control of its control module 150, and the network elements 190 under corresponding control of their control modules 50. The UE 110 may be part of a multicast group 40 (see FIG. 1). For clarity, only a single UE 110 is shown.

In step 1, the UE 110 registers in the PLMN (see, e.g., clause 4.2.2.2 of 3GPP TS 23.502) and requests the establishment of a PDU session (see, e.g., clause 4.3.2.2 of TS 23.502). This step involves the UE 110, the RAN node 170, and the network elements 190. The UE 110 also indicates its capability to receive multicast data over the radio interface. The AMF 190-1 obtains information from the UDM 190-4 as to whether the UE can join multicast sessions as part of the SMF selection subscription data. If so, for direct discovery, the AMF 190-1 selects an SMF 190-2 capable of handling multicast sessions based on locally configured data or a corresponding SMF capability stored in the 5G core Network Repository Function (NRF) and also indicates the UE's capability to receive multicast data over the radio interface to the SMF 190-2.

The NRF is a central node (e.g., a network function) in the 5G core network architecture (e.g., as core network 10). The NRF allows every network function to discover the services offered by other network functions. Refer to 3GPP TS 23.501 clause 4.2.3 for architecture diagram and clause 6.2.6 for functionality description. NRF is network repository function which supports many functionalities like "support SCP discovery by SCP instances", "support service discovery function", "maintain health status of NF and SCP".

In step 2, the content provider announces the availability of multicast using higher layers (e.g., via an application layer). The announcement includes at least the multicast address of a multicast group 40 that the UE 110 can join. The content is announced at the data layer, and is not explicitly shown, but step 2 includes this. For more details, refer to 3GPP TR 23.757, clause 8.2.3 FIG. 8.2.3-1.

For step 3, to join the multicast group session, steps 4 to (till) 9 as described in TR 23.757 are followed.

The SMF 190-2 in step 4 requests the AMF 190-1 to transfer a message to RAN node 190 using, e.g., Namf_NIN2 message transfer service with multicast information, along with multicast group token, TMGI, rekeying token list, rekeying token id, and the like. The rekeying token list contains many pre-generated rekeying tokens and corresponding ids needed for this particular multicast group management. The rekeying token id selects one of the pre-generated rekeying tokens for the RAN node 170 to use, e.g., for when a UE leaves the multicast group 40. It is also noted that the initial key generations using FIG. 2 assumes the rekeying token is zero (or some other value meaning it is not used), but it is also possible a rekeying token could be use initially, and the rekeying token id may be use to select the initial rekeying token.

In step 5, an N2 session request is sent by the AMF 190-1 to the RAN node 170 with multicast related information received from the SMF 190-2.

A rekeying token list is stored in the RAN node 170 in step 6 for future purposes (e.g., in case of rekeying).

For step 7, the RAN node 170 generates multicast key hierarchy (both encryption key and integrity key) needed for the traffic as shown in FIG. 2. The term hierarchy is meant to refer to encryption and integrity keys based on the current rekeying-token. The rest of the rekeying tokens are kept intact. Note that they are not used currently. The rekeying token to be used is indicated by the token id, and the token id to be used is sent by MB-SMF to the RAN node (see step 4). The UE also gets the same indication (see step 8).

In step 8, the RAN node 170 shares, in an encrypted RRC message, the multicast group token and MBS session ID and TMGI to the respective UE 110.

The UE 110, in step 9, which joins the session, will generate the MBS related keys. These may include both encryption KMTenc and integrity keys KMTint. Note that the rekeying token for FIG. 2 is assumed to be zero.

In step 10a, the UPF (e.g., MB-UPF) 190-3 receives multicast PDUs, either directly from the content provider or via the MBSF-U that can manipulate the data (e.g., from the UDM 190-4). The UPF (e.g., MB-UPF) 190-3 sends (step 10b) multicast PDUs in, e.g., an N3/N9 tunnel associated to the multicast distribution session to the RAN node 170. There is generally only one tunnel per multicast distribution session and RAN node, i.e., all associated PDU sessions share this tunnel.

In step 10c, the RAN node 170 performs the encryption of traffic using encryption key KMTenc and performs integrity protection by integrity key KMTint. The RAN node 170 selects PTM or PTP radio bearers to deliver the multicast PDUs to UEs 110 that joined the multicast group 40.

The RAN node 170, in step 11a, performs the transmission of the multicast data using the selected bearer.

In step 11b, the receiving multicast UEs which are part of this MBS session (e.g., matching the MBS group ID) will decrypt the traffic using encryption key KMTenc and also verify the integrity check of the packets received via an integrity protection process using integrity key KMTint.

Figure 4:
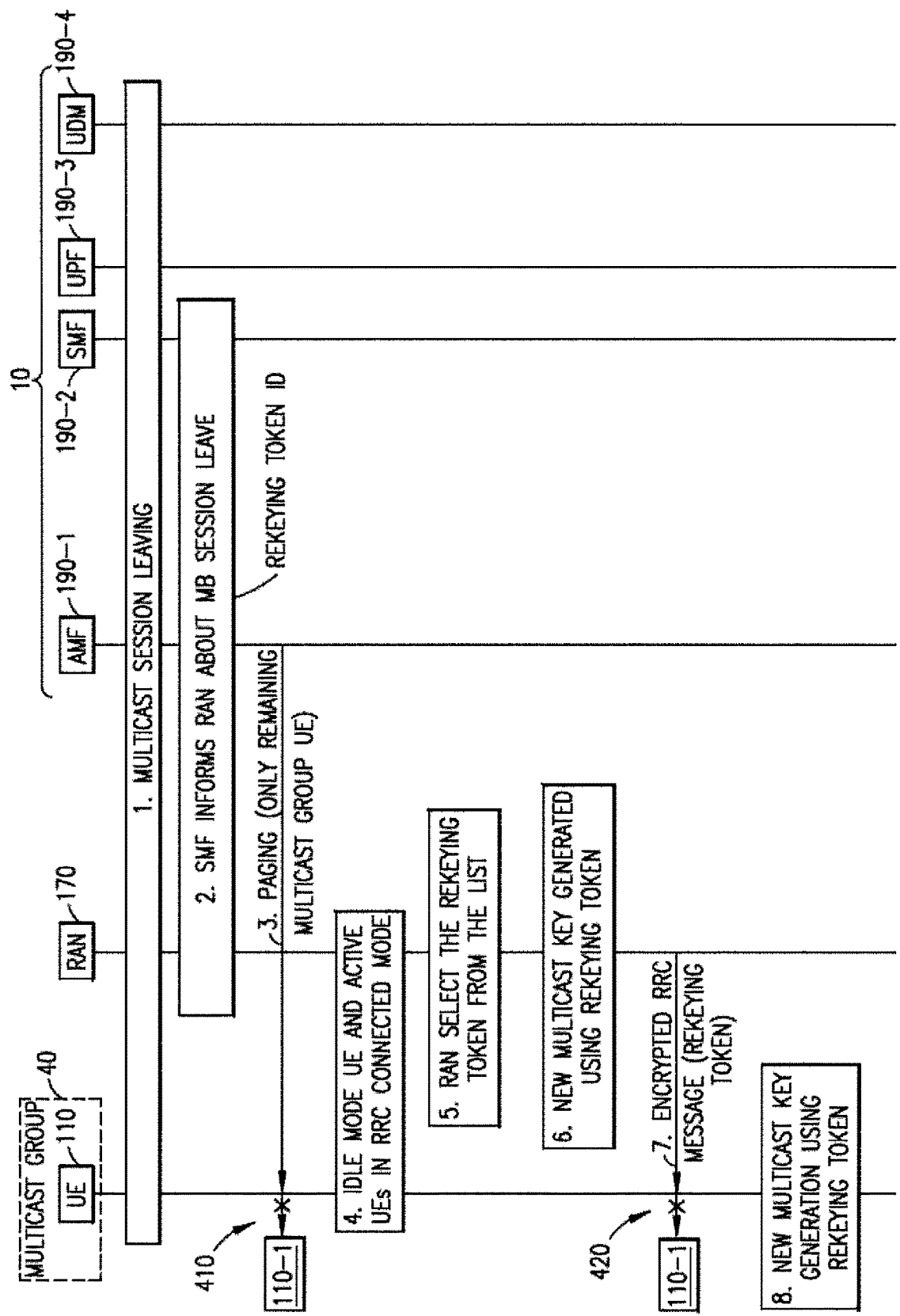
FIG. 4 is a signaling diagram of an MBS procedure for rekeying, in accordance with an exemplary embodiment.

FIG. 3 concerned an initial MBS procedure for key generation and traffic protection. At some point, there will be a need for an MBS procedure for rekeying, e.g., in response to a new UE joining the multicast group 40 or a UE leaving the multicast group 40. FIG. 4 addresses these and other issues, and FIG. 4 is a signaling diagram of an MBS procedure for rekeying, in accordance with an exemplary embodiment. The UE 110 performs the operations under control of its control module 140, the RAN node 170 under control of its control module 150, and the network elements 190 under corresponding control of their control modules 50. The UE 110 may be part of a multicast group 40 (see FIG. 1). For clarity, only a single UE 110 is shown.

In step 1, if a UE in a multicast broadcast is leaving the multicast group 40, then a respective SMF 190-2 is informed about the UE 110 leaving the multicast group 40 and the TMGI.

For step 2, the SMF 190-2 informs the respective RAN node 170 via an AMF 190-1 about a UE leaving an MBS session and initiates a new MBS group management procedure. As one or few UEs may be leaving the group the group 40, the same keys should not be used for ongoing MBS traffic. A rekeying token id may be communicated from the SMF to the RAN node, as described below.

In step 3, it is also possible that one or a few of the remaining UEs (i.e., those UEs that have not left the group 40) are actively listening to the ongoing MBS session while one or a few of the remaining UEs are in idle mode, and may or may not be listening to the traffic. In order to update all the UEs that belong to the new (modified) multicast group, the AMF 190-1 pages the UEs 110 that are in an Idle state (which belong to the new multicast group), so that these UEs will listen to the page and further connect to the network. The UEs that have left the multicast group are excluded from the to-be-paged list. It is noted that both the AMF and RAN node together perform the paging, in the sense at least that indication(s) of the UE or the set of UEs to be paged is/are sent by the AMF to RAN node. The RAN node then broadcasts the paging indication to the indicated UE(s). Paging in this case is an indication to the UEs asking the UEs to connect to the network.

This causes, in step 4, the UEs 110 which were in Idle mode to establish connection to the respective base station. The UEs 110 which were active UEs (already in connected mode) are aligned and will be in connected mode with the respective RAN node 170. So, all the UEs 110 in the MBS group 40 identified by, e.g., the TMGI under the coverage of a given base station (RAN node 170) are connected to the base station now. Note that the terms "state" and "mode" are used interchangeably herein (i.e., connected mode and connected state are considered to be the same).

For step 5, the RAN node 170 selects the rekeying token from the list already received from the SMF 190-2, as instructed by the SMF 190-2. All the RAN nodes 170 should select the same rekeying token, so to aid the same rekeying token selection, the SMF 190-2 also would have sent the rekeying token id to the RAN node 170. This sending would typically occur in step 2. In FIG. 3, step 4 contains the list of rekeying tokens and their corresponding ids. Here in FIG. 4, in step—2, the MB-SMF will send all the RAN nodes the token id to be used.

New multicast keys (both integrity key KMTint and encryption key KMTenc) are generated at the RAN node 170 using a rekeying token (e.g., as illustrated in FIG. 2) in step 6.

In step 7, the RAN node 170 shares, in, e.g., an encrypted RRC message, the rekeying token to respective UEs 110 in the multicast group 40.

Fresh new multicast keys (both integrity key KMTint and encryption key KMTenc) are generated at UEs 110 using the rekeying token in step 8.

It should be noted that the rekeying token is never delivered to the UE which left the MBS session and so with older MBS keys, the MBS traffic cannot be decrypted and an integrity protection check will fail. In more detail, the leaving UE (illustrated as UE 110-1) may be active or Idle. If the leaving UE 110-1 is active, the AMF explicitly tells (e.g., in step 2) the RAN node to exclude the particular UE id from the rekeying list. If the UE 110-1 is in the idle state, the AMF does not include the UE 110-1 in the list of UEs to be paged for connecting to the network and then rekeying. Thus, the UE 110-1 is not paged, as illustrated by reference 410. Since the UE 110-1 has left the broadcast group (group 40), that UE 110-1 is excluded from the group. The leaving UE 110-1 is not given the rekeying token (see reference 420, indicating the UE 110-1 is not provided with the rekeying token) and instead is excluded from rekeying.

It is further noted that, when a new user joins the group, all the new user needs is the current active token and other parameters necessary to generate the encryption and integrity keys. Existing users do not need to be disturbed in order to provide the new user access to the group.

Figure 5:
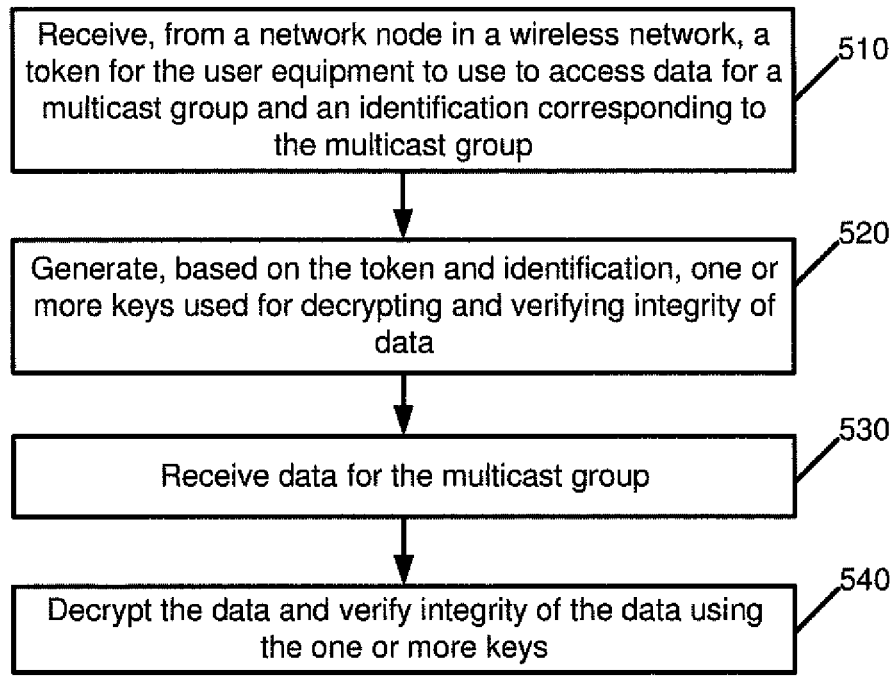
FIGS. 5, 6, and 7 are logic flow diagrams for a secure frame work for key distribution and multicast broadcast group management, for a UE, a network node, and a core network node, respectively, in accordance with exemplary embodiments.
Figure 6:
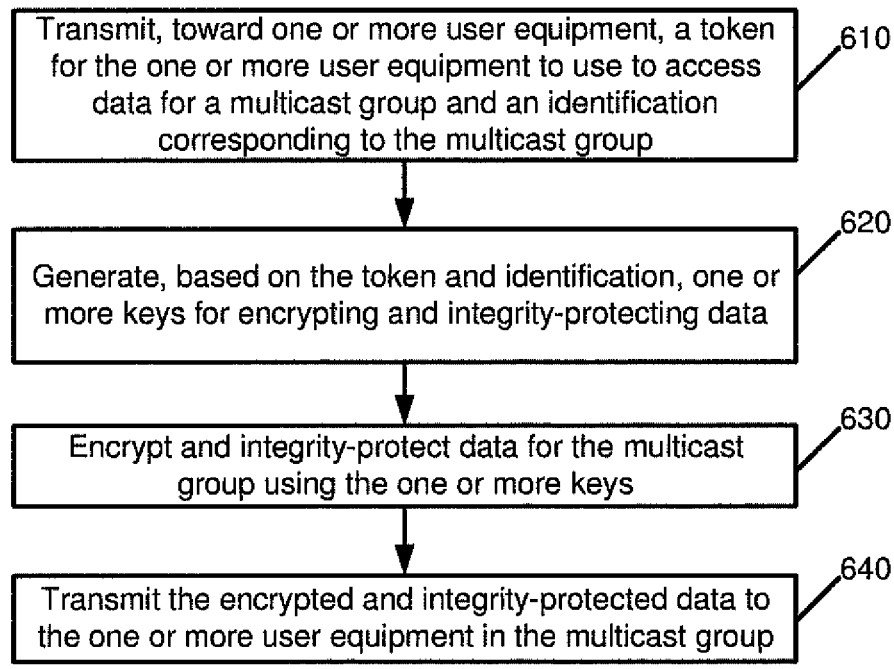
Figure 7:
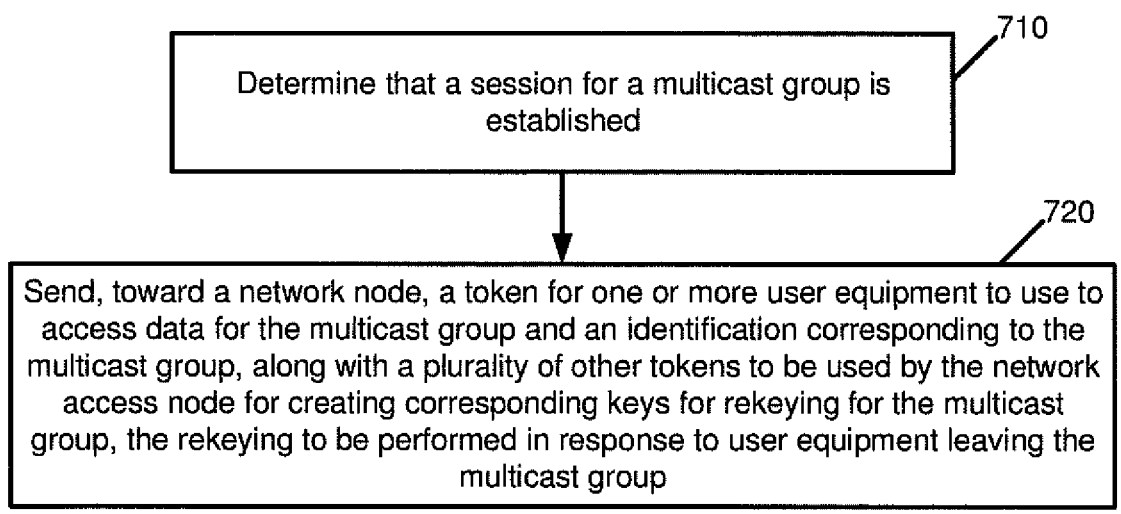

FIGS. 5, 6, and 7 are logic flow diagrams for a secure frame work for key distribution and multicast broadcast group management, for a UE, a network node, and a core network node, respectively, in accordance with exemplary embodiments. These figures illustrate the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 5, this is performed by a UE 110, under control of the control module 140. In block 510, the UE 110 receives, from a network node in a wireless network, a token for the UE to use to access data for a multicast group (e.g., multicast group token 210) and an identification corresponding to the multicast group (e.g., TMGI 225). In block 520, the UE 110 generates, based on the token and identification, one or more keys (e.g., keys 250 and/or 255) used for decrypting and verifying integrity of data. The UE 110 in block 530 receives data for the multicast group, and in block 540 decrypts the data and verifies integrity of the data using the one or more keys.

Turning to FIG. 6, this is performed by a network node, such as a RAN node 170 under control of the control module 150. In block 610, the network node transmits, toward one or more user equipment, a token for the one or more user equipment to use to access data for a multicast group and an identification corresponding to the multicast group. The network node in block 620 generate, based on the token and identification, one or more keys for encrypting and integrity-protecting data. The network node in block 630 encrypts and integrity-protects data for the multicast group using the one or more keys, and in block 640 transmits the encrypted and integrity-protected data to the one or more user equipment in the multicast group.

Referring to FIG. 7, this is performed by a core network node, such as the SMF 190-2, under control of a corresponding control module 50. In block 710, the core network node determines that a session for a multicast group is established. In block 720, the core network node sends, toward a network node in the wireless network, a token for one or more user equipment to use to access data for the multicast group and an identification corresponding to the multicast group, along with a plurality of other tokens to be used by the network access node for creating corresponding keys for rekeying for the multicast group, the rekeying to be performed in response to user equipment leaving the multicast group.

The above addressed certain security issues with MBS. There are, however, possible other security issues with MBS. For instance, here is a problem description of key issues #2 and #3, as captured in TR 33.850.

"5.2 Key Issue #2: Security protection of MBS traffic 5.2.1 Key issue details

According to TR 23.757 [2], MBS traffic needs to be delivered from application service provider to multiple UEs through 5GS. Depending on many factors, multiple delivery methods may be used to deliver MBS traffic. As described in clause 4.4 of TR 23.757 [2], Shared PTP or PTM delivery method and Individual delivery method may be used at the same time for a 5G MBS session depending on selected solution.

The 5GS may provide multiple interfaces for transferring MBS data between UE and external services/networks, such as Uu, N3, N6. MBS traffic needs to be properly protected especially in air interface. While it is still possible to support security for multicast/broadcast traffic at the application layer, it is necessary to consider a security natively provided by the 5G system for the following reasons: There would be multicast/broadcast services that do not have application-level security (e.g., due to protocol overhead) but want to leverage the security provided by 5G system, such as the MBS services provided by operators (e.g., for IoT devices).

As a result, MBS protection independent of application layer protection is to be studied in this key issue. This key issue investigates security protection of 5G MBS PDU sessions/flows at the transport or service level. In Transport layer, the service is provided by the 5G system to deliver multicast datagrams to multiple receivers using minimum network and radio resources, while the service layer is fully separate from the transport layer. This allows for applications that do not require a service layer to establish a multicast transport directly via Nnef (control plane and N6 (user plane data).

5.2.2 Security Threats

Attackers may eavesdrop MBS traffic on the air-interface. Users that have not joined and activated a MBS service receiving that service without being charged.

Modifications and replay of messages in a way to fool the user of the content from the actual source, e.g. replace the actual content with a fake one.

5.2.3 Potential Security Requirements

The 5GS shall support the confidentiality protection, integrity protection, and anti-replay protection of MBS traffic.

5.3 Key Issue #3: Security Protection of Key Distribution 5.3.1 Key Issue Details MBS introduces the concept of a point-to-multipoint service into a 3GPP system. MBS traffic is delivered from application service provider to multiple UEs through 5GS.

To securely transmit data to a given set of users, the MBS traffic needs to be protected to mitigate the potential attacks. As the security fundamental basis, the keys for protection of MBS traffic are required.

Compared with UE keys, the keys for protection of MBS traffic are one-to-many keys. When UE joins the MBS session, only authorized users are able to receive the keys delivered from the key generator for protection of MBS traffic. UEs might also leave an MBS session or be compromised.

5.3.2 Security Threats

If the keys for protection of MBS traffic are not confidentiality protected, an attacker may use the 3GPP network to gain 'free access' of MBS services.

If the keys for protection of MBS traffic are not integrity or anti-replay protected, the authorized users may not be able to acquire the MBS traffic properly.

If the keys for protecting the MBS traffic cannot be updated, then:

If a device in the group leaves, the device might be able to access the content after leaving, If a device joins the group, the device might be able to access previous content, If a device in the group is malicious, the device might be able to inject fake content.

5.3.3 Potential Security Requirements

The distribution of the keys for protection of MBS traffic between the key generator and the UE shall be confidentiality, integrity and anti-replay protected.

The 5GS shall be able to update the keys used to protect the MBS traffic."

These are examples of problems the exemplary embodiments herein may address. An overview of the exemplary embodiments is presented, then more details are presented.

For activation of rekeying, a new rekeying token and MBS timing offset is sent in an exemplary embodiment from the RAN to UE in, e.g., an RRC Reconfiguration message. The UE knows when to activate the new keys and the traffic is protected by the RAN with newly-generated MBS keys. A timing offset may be used to indicate when to expect traffic with new keys.

Concerning key updates for idle-state UEs, a new paging cause value may be added to indicate the idle-mode UEs are to move to the connected state. After the UE is moved to the connected state, the key update can be performed (e.g., as an MBS configuration update).

For a mobility use case, two use cases are considered: (1) one use case when an SMF provides the same rekeying material to all RANs; and (2) another use case where the SMF provides different rekeying material to each RAN. During handover of the UE, the rekeying token (which is currently used in the target RAN) may be delivered to the UE from the SMF. This enables the handed-over UE to receive the MBS traffic also in the target RAN without any loss of MBS traffic.

Figure 8:
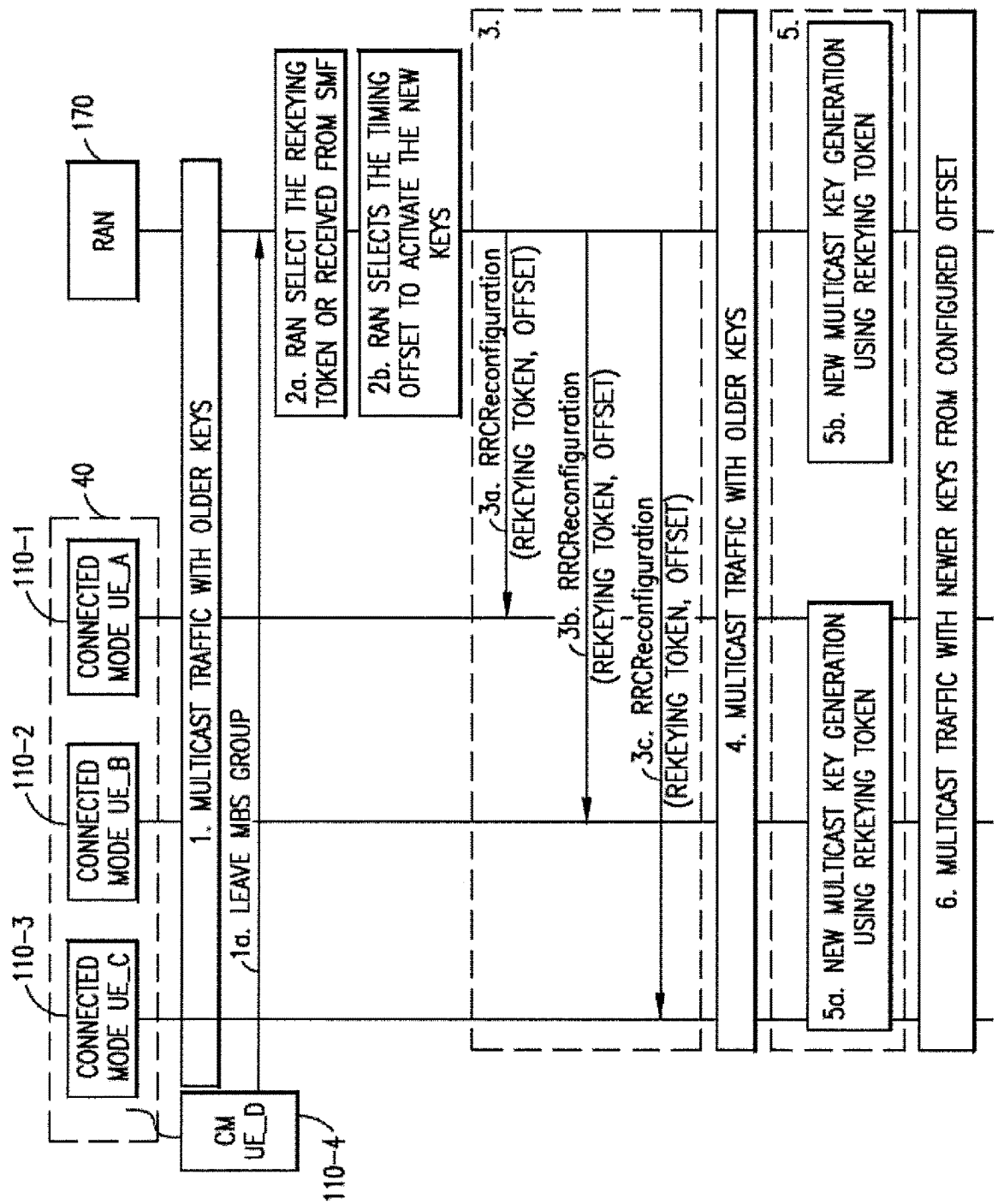
FIG. 8 is a signaling diagram for activation of keying, in accordance with an exemplary embodiment.

Now that an overview has been provided, more details are provided. For activation of rekeying for connected-mode UEs, FIG. 8 is a signaling diagram for activation of keying, in accordance with an exemplary embodiment. FIG. 8 also illustrates the operation of an exemplary method or methods, a result of execution of computer program instructions embodied on a computer readable memory, functions performed by logic implemented in hardware, and/or interconnected means for performing functions in accordance with exemplary embodiment. The signaling and corresponding steps may be performed by a UE 110, under control of the control module 140, and the RAN node 170, under control of the control module 150.

FIG. 8 has a RAN node 170, and three connected-mode UEs: UE_A 110-1; UE_B 110-2; and UE_C 110-3, where the UEs 110 may form a multicast group 40, also referred to as an MBS group 40. Assume that many UEs (example UE_A, UE_B, UE_C and UE_D) are in RRC connected mode with a respective RAN node 170. As connected-mode (CM) UE_D 110-4 leaves the MBS group 40 (also leaving the MBS session), all the other UEs in connected mode need to be updated with a new rekeying token, so new keys can be generated. As indicated above, FIG. 2 indicates the rekeying token is an additional value applied to the key creation process. This token is also applied "on top of" the original key-generation and is considered to be set to zero for the original key generation. That is, after an initial key generation process (where the rekeying token is considered to be zero), the rekeying token has a non-zero value that is applied to the key creation process to generate a different, new key. In more general terms, a "rekeying token" can be any (e.g., non-zero) value applied to a key generation process to generate one or more new keys after initial key creation.

In step 1, there is multicast traffic with older keys. That is, multicast traffic is still being performed with older keys until the new keys are generated in all UEs (and in the RAN). In step 1a, the UE_D 110-4 leaves the MBS group. As a note about this, there are a number of situations that may occur. One is UE leaving the "MBS group" (as in step 1a) and the other is UE leaving the "MBS session" (not illustrated in this figure). For the first situation, rekeying is performed to other UEs in the group, and step 2a (described below) is applicable when a UE leaves the MBS group. In the case of the second situation, where the UE leaves the "MBS session" or there is a RLF (radio link failure) issue or other out-of-coverage issue, these issues are not treated in the MBS session. That is, this situation does not require any rekeying for other UEs. This issue is assumed to be a temporary disconnection and the UE will (re) join shortly with the same keys.

In response to step 1a, in step 2a, the RAN node 170 selects the rekeying token from the rekeying list (provided by SMF during initial phase of MBS group token provisioning) or SMF (e.g., an SMF 190, not shown in this figure) provides this rekeying token, in response to a UE leaving the group, to the RAN node 170. Also, the RAN node 170 calculates the offset indicating when the traffic will use this newly generated key. That is, the offset (also referred to as a timing offset or MBS timing offset) indicates when the UE is to expect the traffic with new keys. Accordingly, the UE can activate newer keys. In more detail, in step 2a, the RAN node 170 selects the rekeying token (e.g., from the previously-provided list) or uses the rekeying token received from the SMF, and in step 2b, the RAN node 170 selects the timing offset to activate the new keys. It is noted that timing offset with calculated with respect to the subframe. Examples are provided below.

In step 3, rekeying is performed. In an RRC reconfiguration message, which is an encrypted message, a rekeying token and mbs-timingOffset (the offset) is sent to all the UEs. The parameter "mbs-timingOffset" is a field indicating the estimated timing for the arrival of the new MBS packets and is protected with a new MBS key (generated with new rekeying token). Specifically, the value may indicate the timing offset with respect to subframe #0 of SFN #0 in milliseconds. In steps 3a, 3b, and 3c, there are RRC Reconfiguration messages to the UEs 110-1, 110-2, and 110-3. Each of these messages includes a rekeying token and the offset.

One example of a suitable RRCReconfiguration message is as follows:

MasterKeyUpdate:: =SEQUENCE {
  keySetChangeIndicator BOOLEAN,
  NextHopChainingCount, nextHopChainingCount
  nas-Container OCTET STRING OPTIONAL, —Cond securityNASC
  mbsRekeyingToken MBSRekeyingToken,
  mbs-timingOffset INTEGER (0 . . . 10239),
  . . .
}

The field mbsRekeyingToken is, in this example, the rekeying token sent by the RAN node 170 to its UEs in the RRC Reconfiguration message.

The field mbs-timingOffset is the field indicating the estimated timing for the new MBS packets arrival and is protected with new MBS key (generated with the new rekeying token). Specifically, the value indicates the timing offset with respect to subframe #0 of SFN #0 in milliseconds.

In step 4, even now the multicast traffic is performed using the older keys, as the configured offset has not been used. In step 5, new multicast keys are generated with the rekeying token in both RAN and all UEs. In step 5a, new multicast key generation using the new rekeying token is performed by the UEs 110. The network performs the rekeying in step 5b, where a new multicast key is generated using the rekeying token. In step 6, multicast traffic communication is performed with newer keys from the configured offset.

Key updates for idle-state UEs are now described. FIG. 9 is an example of a paging message used in the signaling diagram of FIG. 10. In this example, there is a pagingCause information element that is enumerated with the variables voice and MBSKeyUpdate. Use of this information element is described below with respect to FIG. 10.

Figure 10:
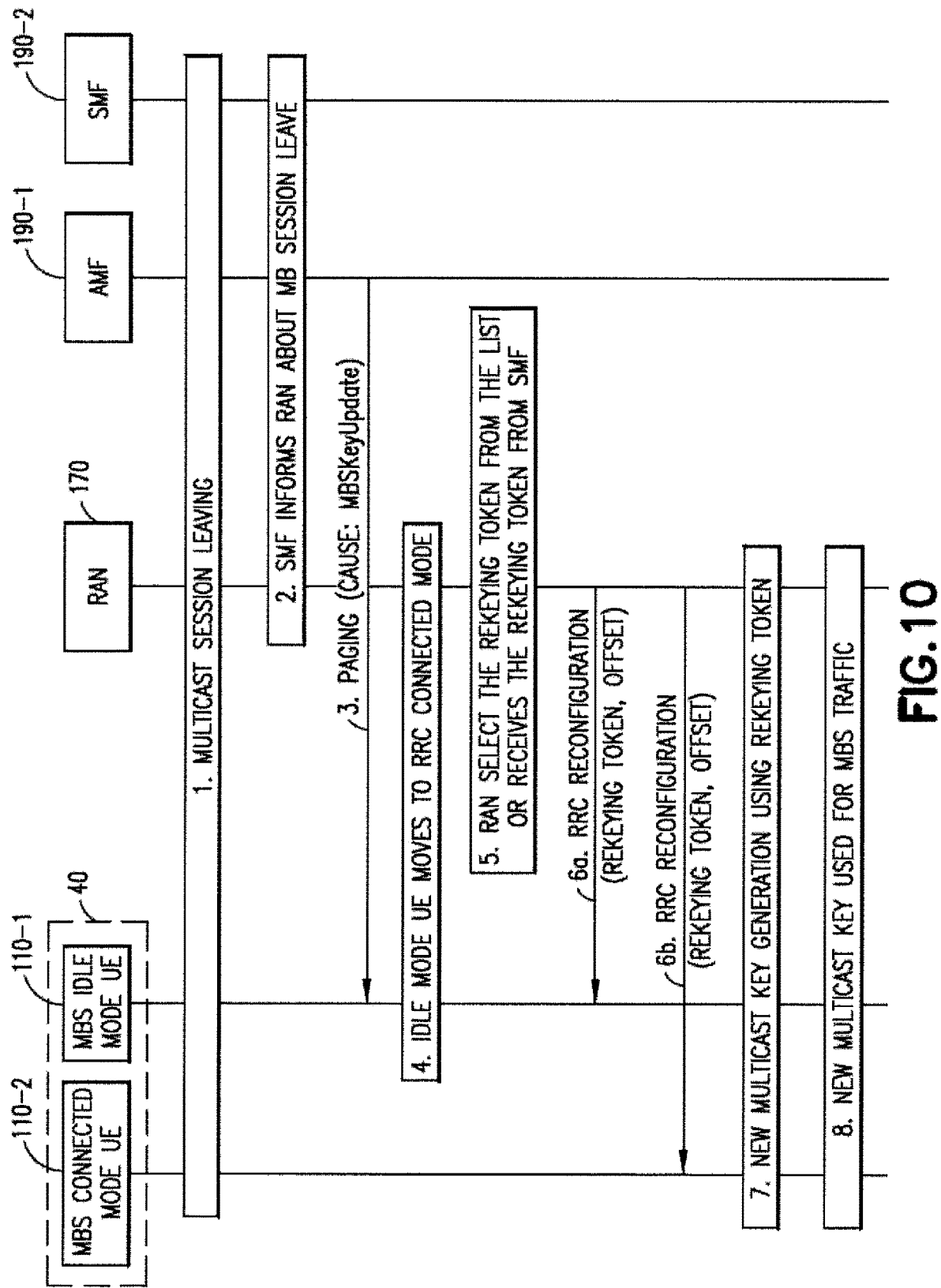
FIG. 10 is a signaling diagram for key update for idle-state UEs, in accordance with an exemplary embodiment.

FIG. 10 is a signaling diagram for key update for idle-state UEs, in accordance with an exemplary embodiment. FIG. 10 also illustrates the operation of an exemplary method or methods, a result of execution of computer program instructions embodied on a computer readable memory, functions performed by logic implemented in hardware, and/or interconnected means for performing functions in accordance with exemplary embodiment. The signaling and corresponding steps may be performed by a UE 110, under control of the control module 140, and the RAN node 170, under control of the control module 150.

In step 1, there is a multicast session leaving, where one UE has already left the multicast session. The UE that left the session is not illustrated. Instead, illustrated in FIG. 10 are an MBS connected-mode UE 110-1 and an MBS idle-mode UE 110-1, which form part of the MBS group 40. In step 2, the SMF 190-2 informs the RAN node 170 about the multicast broadcast session leave, e.g., via the AMF 190-1. One example of this is described in 3GPP TS 23.247, section 7.2.2.2, which explains about the MBS session or group leave. See, e.g., this part of steps 7 and 8 from 3GPP TS 23.247 V1.0.0 (2021-06), where the AMF is informed by SMF. From part of step 7: "In the N2 SM information, the SMF informs the NG-RAN to remove the UE from this MBS session if 5GC Shared MBS traffic delivery method is used. In the N2 SM information, the SMF also informs the NG-RAN to release the mapped unicast QoS Flow(s), which carry or intend to carry the Multicast MBS traffic for 5GC individual MBS traffic delivery." From step 8: "The AMF send N2 message (N2 SM information, N1 SM container) to the NG-RAN".

In order to update the MBS configurations of all the UEs in IDLE mode, a paging message is sent in step 3. As the paging cause is introduced in 3GPP for MUSIM purposes, this is instead extended herein for MBS purposes. Paging cause will have the value "MBSKeyUpdate" (see FIG. 9) and the paging message is sent to all the MBS group of UEs which are in idle mode. So those idle mode UEs will be moved to the connected state to receive the rekeying token and offset information, where the token and offset are as described above.

That is, in step 4, the idle-mode UE 110-1 moves to RRC connected mode in response to the paging message. Both the RAN node 170 and UE 110-1 perform a process to move the UE into the connected mode. Steps 5, 6a, 6b, 7 and 8 are the same as steps 3a, 3b, 4, 5, and 6, respectively, of FIG. 8. For more information regarding how paging is sent from the network 100/gNB 170, and how RRC connection is established and AS security activation is performed, see, e.g., 3GPP TS 38.331 V16.5.0 (2021-06), where section 5.3.2 describes paging, and section 5.3.3 describes RRC connection establishment.

Concerning a mobility use case, in one example, there is no key update between source RAN node 170-1 and target RAN node 170-2. When the SMF distributes the same rekeying token to all RANs, then there is no need for a rekeying procedure during handover. Target and source RANs will use the same keys for that particular MBS session.

Figure 11:
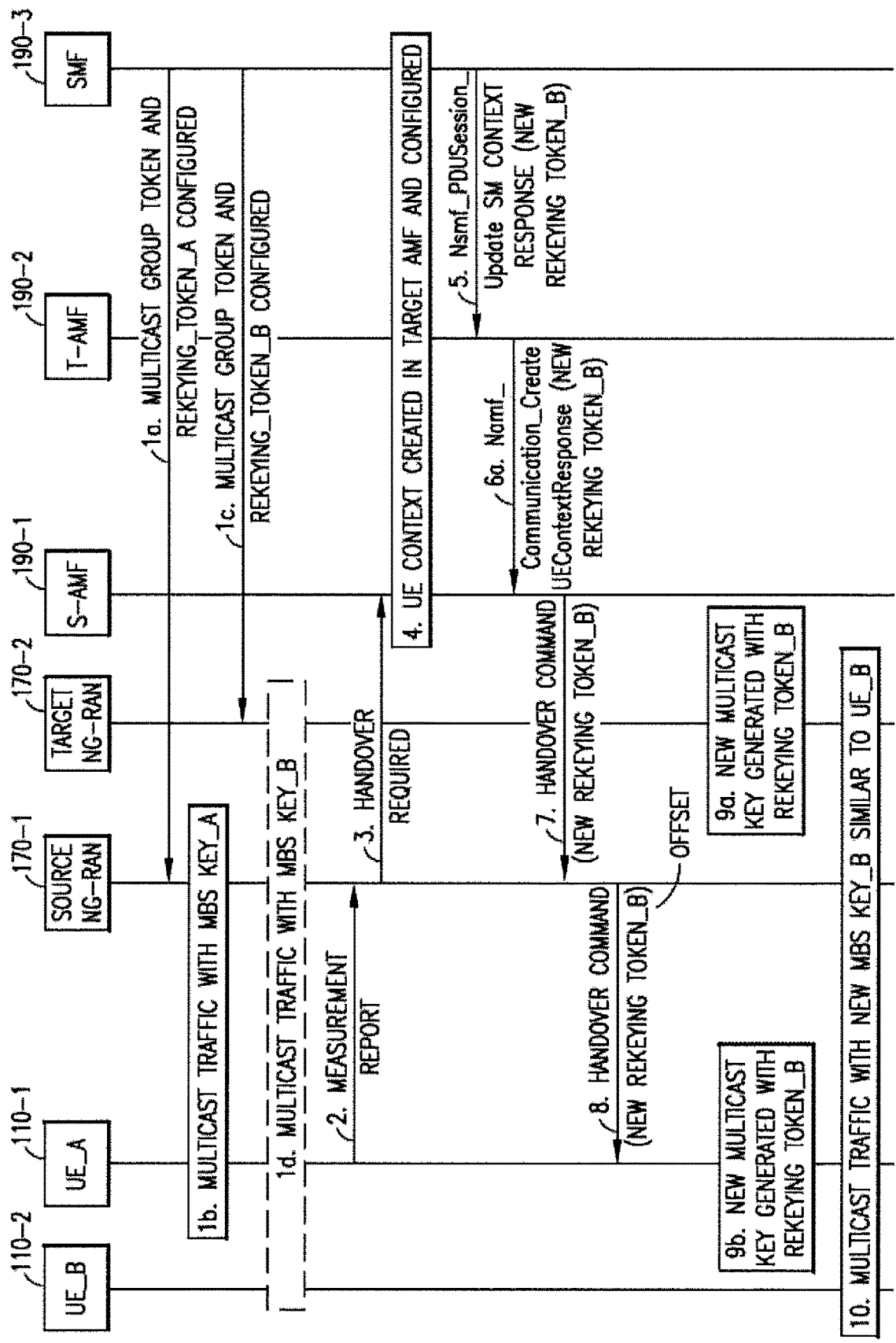
FIG. 11 is a signaling diagram for a mobility use case, in accordance with an exemplary embodiment.

For another example for a mobility use case, key updates are required between source and target RAN. This is illustrated by FIG. 11, which is a signaling diagram for a mobility use case, in accordance with an exemplary embodiment. FIG. 11 illustrates the operation of an exemplary method or methods, a result of execution of computer program instructions embodied on a computer readable memory, functions performed by logic implemented in hardware, and/or interconnected means for performing functions in accordance with exemplary embodiment. The signaling and corresponding steps may be performed by a UE 110, under control of the control module 140, and the RAN node 170, under control of the control module 150.

This second mobility use case is illustrated at least by steps 1a and 1c, where a multicast group token and rekeying_token_A and rekeying_token_B are respectively configured by the SMF 190-3. Multicast traffic is performed with MBS key_A in step 1b, and this occurs between UE_A 110-1 and the source NG-RAN node 170-1. Multicast traffic is also performed with MBS key_B in step 1d, and this is performed between UE_B 110-2 and the target NG-RAN 170-2. That is, there are two separate MBS sessions, one for UE_A/source NG-RAN, and one for UE_B/target NG-RAN. There is, however, one MBS group, and both UE_A and UE_B and their corresponding MBS sessions belong to this group.

When the SMF 190-3 provides a different rekeying token for different RANs, then during the UE handover (of UE_A in this example to the target NG-RAN), the SMF 190-3 needs to update the keys. Assume the source NG-RAN 170-1 has received the multicast group token, which is the same for target NG-RAN 170-2. The difference considered is the rekeying token received at each RAN, which are different. Consider this example. The rekeying_token_A is received (see step 1a) in the source NG-RAN 170-1 and corresponding MBS keys are generated (see step 1b). Similarly, rekeying_token_B is received (see step 1c) in target NG-RAN 170-2 and corresponding MBS keys are generated (see step 1d). UE_A 110-1 is connected to the source NG-RAN 170-1, which will have the same key material and traffic is protected with MBS key_A. The UE_B 110-2 is connected to the target NG-RAN 170-2, which will have the same key material and traffic is protected with MBS key_B. Only one UE is considered here for explanation purposes, but in a practical implementation, more UEs may be connected to NG-RAN and key material will be same as the one UE shown as the example.

When handover is triggered, then the SMF 190-3 will share the rekeying token_B to UE_A 110-1, so the new MBS keys are generated at UE_A 110-1 and target NG-RAN (updated in security context for the UE). UE_A and UE_B, which are connected to target NG-RAN will have same MBS key_B, which can be used for decrypting the incoming traffic.

In further detail, in step 2, a measurement report is sent by the UE_A 170-1 to the source NG-RAN node 170-1. The source NG-RAN node 170-1 sends a handover required message to the S-AMF 190-1 in step 3. In step 4, the S-AMF 190-1 communicates the UE context created in the target AMF and configured via the T-AMF 190-2 and the SMF 190-3. The SMF 190-3 responds in step 5 with an Nsmf-PDUSession_Update, and SM Context Response (with a new rekeying token_B), and in step 6 this is forwarded from the T-AMF 190-2 to S-AMF 190-1.

A handover command (with new rekeying token_B) is sent in step 7 from the S-AMF 190-1 to the source NG-RAN node 170-1, and the handover command (with new rekeying token_B, and also, in an example, the offset) is sent in step 8 from the source NG-RAN node 170-1 to the UE_A 110-1. It is noted that SFN-related information is RAN-related and the core network might not have this information. When a handover command is received from the core network, the offset can be calculated in the RAN. In step 9a, a new multicast key is generated with rekeying token_B by the target NG-RAN 170-2 (e.g., as part of security context), and in step 9b, a new multicast key is generated with rekeying token_B by the UE_A 110-1. In step 10, there is multicast traffic (between UE_A, UE_B, and the target NG-RAN) with a new MBS key_B similar to UE_B.

The following are additional examples.

Example 1. A method, comprising:
in response to a user equipment in a wireless network leaving a multicast group to which the user equipment belonged or switching between multiple access nodes belonging to the multicast group, sending by an access node a rekeying token for one or more user equipment in the multicast group to use to access data for the multicast group;
generating by the access node one or more keys based at least on the rekeying token; and
multicasting traffic from the access node to the one or more user equipment in the multicast group using the one or more keys.

Example 2. The method of example 1, wherein the sending the rekeying token is performed in response to the user equipment leaving the multicast group to which the user equipment belonged, and wherein the sending the rekeying token is to one or more other user equipment in the multicast group to use to access data for the multicast group.

Example 3. The method of example 2, wherein, when the user equipment and one or more other user equipment were in the multicast group prior to the user equipment leaving the multicast group, one or more different keys were used for the multicasting traffic and were based on a different rekeying token.

Example 4. The method of example 3, further comprising the access node performing multicasting traffic to the one or more other user equipment using the one or more different keys at least until the generating the one or more keys based at least on the rekeying token is performed.

Example 5. The method of any one of examples 2 to 4, wherein the access node sends the rekeying token toward each of the one more other user equipment.

Example 6. The method of any one of examples 2 to 5, wherein the access node selects the rekeying token from a list of rekeying tokens or uses a rekeying token received from an element in a core network of the wireless network.

Example 7. The method of example 2, wherein at least one of the one or more other user equipment is in an idle mode, and method comprises, prior to the sending the rekeying token, the following:
sending, by the access node to the at least one other user equipment, a paging message with an indication of a key update being necessary; and
completing by the access node a process of moving the at least one other user equipment to a connected mode.

Example 8. The method of example 1, wherein the sending the rekeying token is performed in response to the user equipment switching between multiple access nodes belonging to the multicast group, and wherein the sending the rekeying token is performed to the user equipment that switched between multiple access nodes to use to access data for the multicast group.

Example 9. The method of example 8, wherein the sending the rekeying token is performed using a handover command.

Example 10. The method of any one of examples 8 or 9, wherein the user equipment is switching from a source access node to a target access node and the source access node sends the rekeying token.

Example 11. The method of any one of examples 1 to 10, wherein an offset is sent along with the rekeying token, the offset for the one or more user equipment to use to determine timing to use within a subframe for the multicasting of the traffic.

Example 12. A method, comprising:
in response to an other user equipment in a wireless network leaving a multicast group to which a user equipment belongs or switching by the user equipment between multiple access nodes belonging to the multicast group, receiving, at the user equipment from an access node, a rekeying token for the user equipment in the multicast group to use to access data for the multicast group;
generating by the user equipment one or more keys based at least on the rekeying token; and
receiving, by the user equipment from the access node, multicast traffic using the one or more keys.

Example 13. The method of example 12, wherein the receiving the rekeying token is performed in response to the other user equipment leaving the multicast group to which the user equipment belongs.

Example 14. The method of example 13, wherein, when the user equipment and other user equipment were in the multicast group prior to the other user equipment leaving the multicast group, one or more different keys were used for the receiving of the multicast traffic and were based on a different rekeying token.

Example 15. The method of example 14, further comprising receiving the multicast traffic by the user equipment from the access node using the one or more different keys at least until the generating the one or more keys based at least on the rekeying token is performed.

Example 16. The method of example 13, wherein the user equipment is in an idle mode, and the method includes, prior to the receiving the rekeying token, the following:
   receiving, by the user equipment from the access node, a paging message with an indication of a key update being necessary; and
   completing, by the user equipment with the access node, a process of moving to a connected mode.

Example 17. The method of example 12, wherein the receiving the rekeying token is performed in response to the user equipment switching between multiple access nodes belonging to the multicast group.

Example 18. The method of example 17, wherein the receiving the rekeying token is performed using a handover command.

Example 19. The method of any one of examples 17 or 18, wherein the user equipment is switching from a source access node to a target access node and the rekeying token is received by the user equipment from the source access node.

Example 20. The method of any one of examples 12 to 19, wherein an offset is received along with the rekeying token, the offset for the user equipment to use to determine timing to use within a subframe for the multicasting of the traffic.

Example 21. A computer program, comprising code for performing the methods of any of examples 1 to 20, when the computer program is run on a computer.

Example 22. The computer program according to example 21, wherein the computer program is a computer program product comprising a computer-readable medium bearing computer program code embodied therein for use with the computer.

Example 23. The computer program according to example 21, wherein the computer program is directly loadable into an internal memory of the computer.

Example 24. An apparatus comprising means for performing:
   in response to a user equipment in a wireless network leaving a multicast group to which the user equipment belonged or switching between multiple access nodes belonging to the multicast group, sending by an access node a rekeying token for one or more user equipment in the multicast group to use to access data for the multicast group;
   generating by the access node one or more keys based at least on the rekeying token; and
   multicasting traffic from the access node to the one or more user equipment in the multicast group using the one or more keys.

Example 25. The apparatus of example 24, wherein the sending the rekeying token is performed in response to the user equipment leaving the multicast group to which the user equipment belonged, and wherein the sending the rekeying token is to one or more other user equipment in the multicast group to use to access data for the multicast group.

Example 26. The apparatus of example 25, wherein, when the user equipment and one or more other user equipment were in the multicast group prior to the user equipment leaving the multicast group, one or more different keys were used for the multicasting traffic and were based on a different rekeying token.

Example 27. The apparatus of example 26, wherein the means are further configured for performing the multicasting traffic by the access node to the one or more other user equipment using the one or more different keys at least until the generating the one or more keys based at least on the rekeying token is performed.

Example 28. The apparatus of any one of examples 25 to 27, wherein the access node sends the rekeying token toward each of the one more other user equipment.

Example 29. The apparatus of any one of examples 25 to 28, wherein the access node selects the rekeying token from a list of rekeying tokens or uses a rekeying token received from an element in a core network of the wireless network.

Example 30. The apparatus of example 25, wherein at least one of the one or more other user equipment is in an idle mode, and apparatus comprises, prior to the sending the rekeying token, the following:
   sending, by the access node to the at least one other user equipment, a paging message with an indication of a key update being necessary; and
   completing by the access node a process of moving the at least one other user equipment to a connected mode.

Example 31. The apparatus of example 24, wherein the sending the rekeying token is performed in response to the user equipment switching between multiple access nodes belonging to the multicast group, and wherein the sending the rekeying token is performed to the user equipment that switched between multiple access nodes to use to access data for the multicast group.

Example 32. The apparatus of example 31, wherein the sending the rekeying token is performed using a handover command.

Example 33. The apparatus of any one of examples 31 or 32, wherein the user equipment is switching from a source access node to a target access node and the source access node sends the rekeying token.

Example 34. The apparatus of any one of examples 24 to 33, wherein an offset is sent along with the rekeying token, the offset for the one or more user equipment to use to determine timing to use within a subframe for the multicasting of the traffic.

Example 35. An apparatus comprising means for performing:
   in response to an other user equipment in a wireless network leaving a multicast group to which a user equipment belongs or switching by the user equipment between multiple access nodes belonging to the multicast group, receiving, at the user equipment from an access node, a rekeying token for the user equipment in the multicast group to use to access data for the multicast group;
   generating by the user equipment one or more keys based at least on the rekeying token; and
   receiving, by the user equipment from the access node, multicast traffic using the one or more keys.

Example 36. The apparatus of example 35, wherein the receiving the rekeying token is performed in response to the other user equipment leaving the multicast group to which the user equipment belongs.

Example 37. The apparatus of example 36, wherein, when the user equipment and other user equipment were in the multicast group prior to the other user equipment leaving the multicast group, one or more different keys were used for the receiving of the multicast traffic and were based on a different rekeying token.

Example 38. The apparatus of example 37, wherein the means are further configured for performing receiving the multicast traffic by the user equipment from the access node using the one or more different keys at least until the generating the one or more keys based at least on the rekeying token is performed.

Example 39. The apparatus of example 36, wherein the user equipment is in an idle mode, and apparatus includes, prior to the receiving the rekeying token, the following:
 receiving, by the user equipment from the access node, a paging message with an indication of a key update being necessary; and
 completing, by the user equipment with the access node, a process of moving to a connected mode.

Example 40. The apparatus of example 35, wherein the receiving the rekeying token is performed in response to the user equipment switching between multiple access nodes belonging to the multicast group.

Example 41. The apparatus of example 40, wherein the receiving the rekeying token is performed using a handover command.

Example 42. The apparatus of any one of examples 40 or 41, wherein the user equipment is switching from a source access node to a target access node and the rekeying token is received by the user equipment from the source access node.

Example 43. The apparatus of any one of examples 35 to 42, wherein an offset is received along with the rekeying token, the offset for the user equipment to use to determine timing to use within a subframe for the multicasting of the traffic.

Example 44. The apparatus of any preceding apparatus example, wherein the means comprises:
 at least one processor; and
 at least one memory including computer program code, the at least one memory and computer program code configured to, with the at least one processor, cause the performance of the apparatus.

Example 45. An apparatus, comprising:
 one or more processors; and
 one or more memories including computer program code,
 wherein the one or more memories and the computer program code are configured, with the one or more processors, to cause the apparatus to:
  in response to a user equipment in a wireless network leaving a multicast group to which the user equipment belonged or switching between multiple access nodes belonging to the multicast group, send by an access node a rekeying token for one or more user equipment in the multicast group to use to access data for the multicast group;
  generate by the access node one or more keys based at least on the rekeying token; and
  multicast traffic from the access node to the one or more user equipment in the multicast group using the one or more keys.

Example 46. An apparatus, comprising:
 one or more processors; and
 one or more memories including computer program code,
 wherein the one or more memories and the computer program code are configured, with the one or more processors, to cause the apparatus to:
  in response to an other user equipment in a wireless network leaving a multicast group to which a user equipment belongs or switching by the user equipment between multiple access nodes belonging to the multicast group, receive, at the user equipment from an access node, a rekeying token for the user equipment in the multicast group to use to access data for the multicast group;
  generate by the user equipment one or more keys based at least on the rekeying token; and
  receive, by the user equipment from the access node, multicast traffic using the one or more keys.

Example 47. A computer program product comprising a computer-readable storage medium bearing computer program code embodied therein for use with a computer, the computer program code comprising:
 code, in response to a user equipment in a wireless network leaving a multicast group to which the user equipment belonged or switching between multiple access nodes belonging to the multicast group, for sending by an access node a rekeying token for one or more user equipment in the multicast group to use to access data for the multicast group;
 code for generating by the access node one or more keys based at least on the rekeying token; and
 code for multicasting traffic from the access node to the one or more user equipment in the multicast group using the one or more keys.

Example 48. A computer program product comprising a computer-readable storage medium bearing computer program code embodied therein for use with a computer, the computer program code comprising:
 code, in response to an other user equipment in a wireless network leaving a multicast group to which a user equipment belongs or switching by the user equipment between multiple access nodes belonging to the multicast group, for receiving, at the user equipment from an access node, a rekeying token for the user equipment in the multicast group to use to access data for the multicast group;
 code for generating by the user equipment one or more keys based at least on the rekeying token; and
 code for receiving, by the user equipment from the access node, multicast traffic using the one or more keys.

Without in any way limiting the scope, interpretation, or application of the claims appearing below, a technical effect and advantage of one or more of the example embodiments disclosed herein is RAN level key generation and distribution is re-using the existing signaling and security mechanism from 33.501 with less impact.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
CM connected-mode
CU central unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MBS multicast-broadcast service
MME mobility management entity
MUSIM multiple universal subscriber identity module
ng or NG next generation
ng-eNB or NG-eNB next generation eNB
NR new radio
N/W or NW network
PDCP packet data convergence protocol
PHY physical layer
RAN radio access network
Rel release
RLC radio link control
RRH remote radio head
RRC radio resource control
RU radio unit
Rx receiver
S-AMF source access mobility function
SDAP service data adaptation protocol
SFN subframe number
SGW serving gateway
SMF session management function
T-AMF target access mobility function
TS technical specification
Tx transmitter
UE user equipment (e.g., a wireless, typically mobile device)
UPF user plane function

What is claimed is:

1. A method, comprising:
in a user equipment belonging to a multicast group in a wireless network and in response to an other user equipment in the wireless network leaving the multicast group, receiving, at the user equipment from an access node, a rekeying token for the user equipment in the multicast group to use to access data for the multicast group;
generating by the user equipment multiple keys based at least on the rekeying token, the generating the multiple keys comprising generating a first key for encrypting multicast traffic and generating a second key for integrity protection of the multicast traffic, wherein:
generating the first key for encrypting the multicast traffic comprises generating the first key using an algorithm distinguisher for encryption algorithms, an identifier that identifies which algorithm is to be used for encryption, the rekeying token, and an identifier to identify the multicast group; and
generating the second key for encrypting the multicast traffic comprises generating the second key using an algorithm distinguisher for integrity algorithms, an identifier that identifies which algorithm is to be used for integrity, the rekeying token, and the identifier to identify the multicast group;
receiving, by the user equipment from the access node, the multicast traffic using the multiple keys; and
decrypting the received multicast traffic that has been encrypted using the first key and decrypting the received multicast traffic that has been integrity protected using the second key.

2. The method of claim 1, wherein the receiving the rekeying token is performed in response to the other user equipment leaving the multicast group to which the user equipment belongs.

3. The method of claim 2, wherein, when the user equipment and other user equipment were in the multicast group prior to the other user equipment leaving the multicast group, one or more different ones of the multiple keys were used for the receiving of the multicast traffic and were based on a different rekeying token.

4. The method of claim 3, further comprising receiving the multicast traffic by the user equipment from the access node using the one or more different ones of the multiple keys at least until the generating the multiple keys based at least on the rekeying token is performed.

5. The method of claim 2, wherein the user equipment is in an idle mode, and the method includes, prior to the receiving the rekeying token, the following:
   receiving, by the user equipment from the access node, a paging message with an indication of a key update being necessary; and
   completing, by the user equipment with the access node, a process of moving to a connected mode.

6. The method of claim 1, wherein an offset is received along with the rekeying token, the offset for the user equipment to determine timing of when to expect traffic that will use the multiple keys within a subframe for multicasting of the traffic.

7. The method according to claim 1, wherein the rekeying token is set to zero for an initial key generation of the multiple keys, and wherein the rekeying token has a non-zero value that is applied to a key creation process performed by the generating the multiple keys.

8. An apparatus, comprising:
   one or more processors; and
   one or more memories storing instructions that, when executed by the one or more processors, cause the apparatus to perform at least the following:
   in a user equipment belonging to a multicast group in a wireless network and in response to an other user equipment in the wireless network leaving the multicast group, receiving, at the user equipment from an access node, a rekeying token for the user equipment in the multicast group to use to access data for the multicast group;
   generating by the user equipment multiple keys based at least on the rekeying token, the generating the multiple keys comprising generating a first key for encrypting multicast traffic and generating a second key for integrity protection of the multicast traffic, wherein:
      generating the first key for encrypting the multicast traffic comprises generating the first key using an algorithm distinguisher for encryption algorithms, an identifier that identifies which algorithm is to be used for encryption, the rekeying token, and an identifier to identify the multicast group; and
      generating the second key for encrypting the multicast traffic comprises generating the second key using an algorithm distinguisher for integrity algorithms, an identifier that identifies which algorithm is to be used for integrity, the rekeying token, and the identifier to identify the multicast group;
   receiving, by the user equipment from the access node, the multicast traffic using the multiple keys; and
   decrypting the received multicast traffic that has been encrypted using the first key and decrypting the received multicast traffic that has been integrity protected using the second key.

9. The apparatus of claim 8, wherein the receiving the rekeying token is performed in response to the other user equipment leaving the multicast group to which the user equipment belongs.

10. The apparatus of claim 9, wherein, when the user equipment and other user equipment were in the multicast group prior to the other user equipment leaving the multicast group, one or more different ones of the multiple keys were used for the receiving of the multicast traffic and were based on a different rekeying token.

11. The apparatus of claim 10, wherein the one or more memories further store instructions that, when executed by the one or more processors, cause the apparatus to perform the following: receiving the multicast traffic by the user equipment from the access node using the one or more different ones of the multiple keys at least until the generating the multiple keys based at least on the rekeying token is performed.

12. The apparatus of claim 9, wherein the user equipment is in an idle mode, and wherein the one or more memories further store instructions that, with the one or more processors, cause the apparatus to, prior to the receiving the rekeying token, perform the following:
   receiving, by the user equipment from the access node, a paging message with an indication of a key update being necessary; and
   completing, by the user equipment with the access node, a process of moving to a connected mode.

13. The apparatus of claim 8, wherein an offset is received along with the rekeying token, the offset for the user equipment to determine timing of when to expect traffic that will use the multiple keys within a subframe for multicasting of the traffic.

14. The apparatus according to claim 8, wherein the rekeying token is set to zero for an initial key generation of the multiple keys, and wherein the rekeying token has a non-zero value that is applied to a key creation process performed by the generating the multiple keys.

15. A non-transitory computer readable medium comprising program instructions stored thereon for causing an apparatus to perform at least the following:
   in a user equipment belonging to a multicast group in a wireless network and in response to an other user equipment in the wireless network leaving the multicast group, receiving, at the user equipment from an access node, a rekeying token for the user equipment in the multicast group to use to access data for the multicast group;
   generating by the user equipment multiple keys based at least on the rekeying token, the generating the multiple keys comprising generating a first key for encrypting multicast traffic and generating a second key for integrity protection of the multicast traffic, wherein:
      generating the first key for encrypting the multicast traffic comprises generating the first key using an algorithm distinguisher for encryption algorithms, an identifier that identifies which algorithm is to be used for encryption, the rekeying token, and an identifier to identify the multicast group; and
      generating the second key for encrypting the multicast traffic comprises generating the second key using an algorithm distinguisher for integrity algorithms, an identifier that identifies which algorithm is to be used for integrity, the rekeying token, and the identifier to identify the multicast group; and
   receiving, by the user equipment from the access node, the multicast traffic using the multiple keys; and
   decrypting the received multicast traffic that has been encrypted using the first key and decrypting the received multicast traffic that has been integrity protected using the second key.

\* \* \* \* \*